A. M. KNAPP.
Rubber-Nipple.
No. 167,613.  Patented Sept. 14, 1875.
FIG-1-
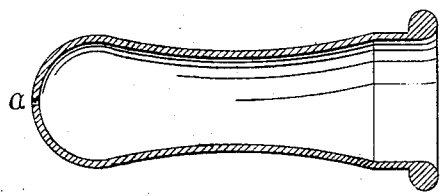
FIG-2-
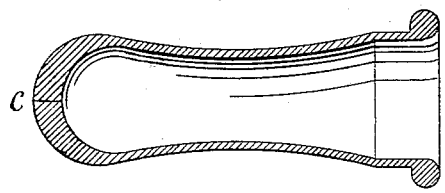
FIG-3-
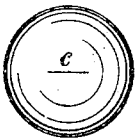
FIG-4-
WITNESSES.
Thos. J. Shearman.
Horace Knapp.
INVENTOR.
Albert M. Knapp.

UNITED STATES PATENT OFFICE.

ALBERT M. KNAPP, OF PROVIDENCE, RHODE ISLAND.

IMPROVEMENT IN RUBBER NIPPLES.

Specification forming part of Letters Patent No. 167,613, dated September 14, 1875; application filed August 5, 1875.

*To all whom it may concern:*

Be it known that I, ALBERT M. KNAPP, of Providence, in the county of Providence, State of Rhode Island, have invented certain Improvements in Rubber Nipples, of which the following is a specification:

The nature of my improvement consists in constructing rubber nipples, such as are used in connection with the common nursing-bottles, so that they will operate as a check to the flow of milk back into the bottle the moment the babe ceases to suck, thus avoiding the frequent necessity of drawing in a tube full of air before getting the milk, since the air, when swallowed, is injurious to the child.

Figure 1 shows a sectional drawing of the unimproved rubber nipple. At the end $a$ is seen a small round perforation, through which the milk passes during the act of nursing. These nipples are manufactured of rubber of uniform thickness.

Fig. 2 shows a sectional drawing of the improved rubber nipple. At $e$, corresponding with the circular perforation as seen at $a$, shown in Fig. 1, is cut a fine slit or lineal division a few lines in length, which, when the nipple is not compressed by the lips and tongue of the babe while in the act of nursing, is perfectly air-tight, owing to the perfect adaptation and the natural tendency of the rubber to retain the original shape into which it is molded. In order to secure a greater degree of resistance and stronger adaptation of the sides of the division, the rubber nipple is made thicker at the end where the division is located.

Fig. 3 illustrates an end view of the improvement when the nipple is not compressed. It is observed that the sides of the division $c$ are regular and close in contact.

Fig. 4 shows the effect produced upon Fig. 3 when the same is compressed, as in the act of nursing. The sides of the division $c$ are separated to a sufficient extent, so as to permit a free flow of milk through the tubes of the nursing-bottle upon suction.

When a rubber nipple thus constructed is attached as in the ordinary nursing-bottle, and the milk is once drawn up into the tube and nipple, owing to atmospheric pressure it will remain there when compression is removed from the nipple.

I claim as my invention and desire to secure by Letters Patent—

In a rubber nipple, the combination of a thickened end and a fine lineal division, $c$, all arranged as and for the purpose set forth.

ALBERT M. KNAPP.

Witnesses:
JOHN H. BONGARTY,
SIMON S. LAPHAM.